(12) United States Patent
Styron et al.

(10) Patent No.: US 6,554,894 B2
(45) Date of Patent: Apr. 29, 2003

(54) MASONRY CEMENT COMPOSITION AND METHOD OF MAKING

(75) Inventors: Robert William Styron, Marietta, GA (US); Richard George Basaraba, Smyrna, GA (US); James Kenneth Hicks, Lawrenceville, GA (US)

(73) Assignee: Mineral Resource Technologies, LLC, Atlanta, GA (US)

( * ) Notice: Subject to any disclaimer, the term of this patent is extended or adjusted under 35 U.S.C. 154(b) by 0 days.

(21) Appl. No.: 09/880,549

(22) Filed: Jun. 13, 2001

(65) Prior Publication Data

US 2002/0014186 A1 Feb. 7, 2002

Related U.S. Application Data

(60) Provisional application No. 60/211,070, filed on Jun. 13, 2000.

(51) Int. Cl.$^7$ .............................. C04B 7/28; C04B 7/12
(52) U.S. Cl. ........................ 106/705; 106/706; 106/707; 106/708; 106/709; 106/710; 106/737; 106/810; 106/DIG. 1; 264/DIG. 49
(58) Field of Search ................................. 106/705, 706, 106/707, 708, 709, 710, 737, 810, DIG. 1; 264/DIG. 49

(56) References Cited

U.S. PATENT DOCUMENTS

| | | | | |
|---|---|---|---|---|
| 3,865,601 A | * | 2/1975 | Serafin et al. | |
| 3,885,985 A | * | 5/1975 | Serafin et al. | |
| 3,926,650 A | * | 12/1975 | Lange et al. | |
| 4,375,987 A | * | 3/1983 | Lange et al. | |
| 4,659,385 A | | 4/1987 | Costopoulos et al. | |
| 4,737,193 A | * | 4/1988 | Gutmann et al. | |
| 4,828,619 A | | 5/1989 | Matsushita et al. | |
| 5,178,668 A | * | 1/1993 | Traver et al. | 106/287.11 |
| 5,294,256 A | * | 3/1994 | Weigand et al. | 106/819 |
| 5,306,344 A | * | 4/1994 | Gutmann et al. | 106/714 |
| 5,374,308 A | * | 12/1994 | Kirkpatrick et al. | 106/709 |
| 5,387,283 A | * | 2/1995 | Kirkpatrick et al. | 106/709 |
| 5,489,334 A | * | 2/1996 | Kirkpatrick et al. | 106/709 |
| 5,490,889 A | * | 2/1996 | Kirkpatrick et al. | 106/709 |
| 5,714,002 A | * | 2/1998 | Styron | 106/705 |
| 5,714,003 A | | 2/1998 | Styron | |
| 5,753,037 A | * | 5/1998 | Drs et al. | 106/823 |
| 5,782,972 A | * | 7/1998 | Abelleira et al. | 106/696 |
| 6,231,665 B1 | * | 5/2001 | Kerkar et al. | 106/810 |

FOREIGN PATENT DOCUMENTS

| | | |
|---|---|---|
| EP | 0 744 386 A | 11/1996 |
| EP | 0858 978 A | 8/1998 |
| JP | 04 317447 | 11/1992 |
| JP | 10 146823 | 6/1998 |

OTHER PUBLICATIONS

*Concrete Admixtures Handbook: Properties, Science, & Technology* VS Ramachandran pp. 269, 506, 518 and 519, 1984.*

*Concrete Technology and Practice* Taylor p. 135, 1965.*

Bouzoubaa et al., Laboratory–Produced High–Volume Fly Ash Blended Cements: Physical Properties And Compressive Strength of Mortars, Cement and Concrete Research, vol. 28, No. 11, pp. 1555–1569, (1998).

Styron, Fly Ash Lightweight Aggregate: The Agglite Process, Proceedings: Eighth International Ash Utilization Symposium, vol. 2, Oct. (1987) pp. 58.1–58.12.

Yasuda et al., Study Of FGC Concrete And Its Use For Artifical Fishing Reefs, Seventh International Ash Utilization Symposium and Exposition: vol. II, Mar. (1985), pp. 763–775.

Ying, Improving The Early Strength Of Fly Ash Cement And Studying The Storage Properties Of Fly Ash Granule, Proc. Int. Ash Util, Sump. Expo., 7th, vol. 1, pp. 273–279 (No date available).

SNEL, Fly Ash Production And Utilization In The Netherlands, EPRI Workshop on Research and Development Needs for Use of Fly Ash in Cement and Concrete, Mar. (1981) pp. 3.67–3.79.

Prusinski et al., Houston Lighting & Power Company's Coal Combustion By–Products Utilization Program: A Decade of Success, Proceedings of the sixteenth biennial low–rank fuels symposium,May (1991), pp. 344–360.

Minnick, Development Of Potential Uses For The Residue From Fluidized Bed Combustion Processes, Quarterly Technical Progress Report, Dec.(79)–Feb. 80, pp. 1–33.

Pytel et al., Effect of grain size composition of the calcium–sulphate fly ashes on the properties of autoclaved building materials, Environment Aspects of Construction with Waste Materials, (1994), pp. 909–915.

Majumdar et al., Properties Of Some Blended–High Alumina Cements, Cement and Concrete Research, vol. 22, No. 6, pp. 1101–1114, 1992.

Parrott, Variations Of Water Absorption Rate And Porosity With Depth From An Exposed Concrete Surface: Effects Of Exposure Conditions And Cement Type, Cement and Concrete Research, vol. 22, No. 6, pp. 1077–1088, 1992.

Kelham, Portland—limestone cements, Concrete, May 1998, pp. 30–31.

Bremner, Influence of Aggregate Microstructure on the Volume Stability of Lightweight Concrete Masonry, Masonry: Design and Construction, Problems and Repair, ASTM STP 1180, 1993, pp. 186–196.

(List continued on next page.)

*Primary Examiner*—Paul Marcantoni
(74) *Attorney, Agent, or Firm*—Killworth, Gottman, Hagan & Schaeff, L.L.P.

(57) ABSTRACT

A masonry cement composition is provided which contains a blend of fly ash, Portland cement, a retarding agent, and an air entrainment agent. The masonry cement composition may be formed into a mortar having a high air content which exhibits good compressive strength and does not exhibit efflorescence.

11 Claims, No Drawings

OTHER PUBLICATIONS

Beretka, The Utilization Of Fly Ash In The Manufacture Of Building Materials, Third National Chemical Engineering at Mildura, Victoria, Australia, Aug. 20–23, 1975, pp. T–177–178.

Bland et al., Use Potential Of Ash From Circulating Pressurized Fluidized Bed Combustors Using Low–Sulfur Sub–bituminous Coal, Fluidized Bed Combustion—vol. 2, ASME 1995, pp. 1229–1242.

McCarthy et al., Towards maximising the use of fly ash as a binder, Fuel 78, 1999, pp. 121–132.

Billinge et al., The Disposal of Solid Combustion Products from Power Stations, Energy and the Environment, pp. 177–192 (No date available).

Tadros et al., State–of–the–Art Concrete Masonry Units, TMS Journal, Aug. 1992, pp. 47–60.

Ali et al., Strength Properties of Cement–Stabilized Municipal Solid Waste Incinerator Ash Masonry Bricks, ACI Materials Journal, V. 91, No. 3, May–Jun. 1994, pp. 256–263.

Cook et al., Rice Husk Ash–Lime Cement Mixes for use in Masonry Units, pp. 281–288 No date available.

Malhotra, Fly Ash, Silica Fume, Slag, and Natural Pozzolans in Concrete, Proceedings Second International Conference Madrid, Spain, 1986, vol. 2, pp. i, iii, v, vii.

Stephens et al., Use of Class C fly ash in lightweight aggregate and concrete masonry units (Abstract), Proceedings: 11th International Symposium on use and management of coal combustion by–products (CCBs), vol. 2, 1995, pp. 55.1–55.11.

Ju et al., Preparation of building mortar using calcium–added fly ash (Abstract), Guisuanyan Jianzhu Zhipin, No. 3, 1993, pp. 13–18.

* cited by examiner

MASONRY CEMENT COMPOSITION AND METHOD OF MAKING

CROSS REFERENCE TO RELATED APPLICATIONS

This application claims the benefit of U.S. provisional application Ser. No. 60/211,070 filed Jun. 13, 2000.

BACKGROUND OF THE INVENTION

The present invention relates to a masonry cement composition and a method of making the cement, and more particularly, to a masonry cement composition which contains a blend of fly ash, portland cement, a retarding agent, and an air entrainment agent. The cement composition may be used to produce a mortar which exhibits good compressive strength and does not exhibit efflorescence.

Masonry cement compositions are widely used in the masonry industry and typically comprise a blend of portland cement clinker and limestone (calcium carbonate), which contains entrained air for workability of the mix and produces a product that is light and fluffy. However, a disadvantage of the addition of calcidic products such as limestone is that they can produce a mortar which exhibits efflorescense. Efflorescence generally consists of the formation of hard accretions resembling unsightly white spots or streaks on the surface of the mortar which are deposited on the concrete by the evaporation of water.

To help eliminate the problem of efflorescence, masonry cements have been developed which contain portland cement, an air entraining agent, and a filler such as limestone which provides plasticity to the cement. These components are typically interground in a ball mill to sufficient fineness to afford the desired plasticity, color and compressive strength. However, the addition of limestone has been found to reduce the compressive strength of the cement. It is important that masonry cement be able to form a mortar which adequately meets the strength and other recognized specifications such as set rate set forth by the American Society for Testing and Materials (ASTM) (ASTM C 91–98 for Masonry Cement and ASTM C 270-97 for Mortar for Unit Masonry).

In commonly assigned U.S. Pat. Nos. 5,714,003 and 5,997,632, the disclosures of which are hereby incorporated by reference, there is disclosed a blended hydraulic cement which meets the Standard Performance Specifications for Blended Hydraulic Cement in ASTM C 1157 M-95. However, while such blended hydraulic cements can be used as the base for a masonry cement, they lack the degree of air entrainment for use as a masonry cement.

Accordingly, there is still a need in the art for providing an improved masonry cement which does not contain interground limestone, and which produces a mortar having good compressive strength and an acceptable rate of set.

SUMMARY OF THE INVENTION

The present invention meets that need by providing a masonry cement composition which utilizes fly ash, Portland cement, and an air entraining agent to product a masonry cement which exhibits excellent workability, water retention, and compressive strength. The cement conforms to ASTM C-91 standard specifications for masonry cements. The resulting mortar preferably has an air content of at least 8%, and more preferably, up to 17%.

According to one aspect of the present invention, a masonry cement is provided comprising about 0.1 to 10% Portland cement, about 0.1 to 5% by weight potassium carbonate, from about 0.1 to 30% by weight of a retarding agent, from about 0.1 to 5% by weight of an air entraining agent, and the balance comprising fly ash.

The retarding agent is preferably selected from the group consisting of gypsum, borax, boric acid, citric acid, high alumina clays, and mixtures thereof.

The fly ash used in the masonry cement preferably has a lime (calcium oxide) content of at least 21% by weight, and more preferably, about 25% by weight. The fly ash used is preferably a subbituminous fly ash and preferably comprises about 80 to 95% by weight of the masonry cement composition.

In one embodiment of the invention, the air entraining agent comprises from about 0.1 to 5% by weight of a foaming agent. Where the air entraining agent comprises a foaming agent, the cement composition preferably further includes from about 01.% to about 5% by weight of a foam stabilizer. In an alternative embodiment of the invention, the air entraining agent comprises about 0.1 to 5% by weight of a resin.

The cement preferably further includes from about 0.01 to 3 by weight of a chelating agent. The cement may also include from about 0.1 to 10% by weight of a coloring agent.

The masonry cement composition also preferably includes a water repelling agent selected from the group consisting of stearates and ethylene vinyl acetate.

The masonry cement of the present invention may be mixed with sand and water in a conventional manner to produce a workable mortar suitable for all types of masonry applications. It should be noted that the cement of the present invention requires the addition of less water than prior art masonry cements. The masonry cement may be provided in a variety of colors and may have color added at a job site. In use, the mortar produced from the masonry cement sets and hardens comparably to Portland cement based masonry cements. However, the masonry cement composition of the present invention provides easier workability, greater flexibility in times to tool masonry joints, and is lighter in mass. As a result, less effort is required by the mason to lay masonry units.

The resulting mortar preferably has a compressive strength of at least 800 psi after 7 days, and more preferably, at least 1400 psi.

Accordingly, it is a feature of the present invention to provide a masonry cement composition which does not contain lime products, which provides good compressive strength, and which produces an acceptable rate of set. Other features and advantages of the invention will be apparent from the following detailed description and the appended claims.

DETAILED DESCRIPTION OF THE PREFERRED EMBODIMENT

The masonry cement composition of the present invention provides a number of advantages over prior art masonry cements in that the composition may be adjusted according to the desired set time and strength for a particular application. The present invention also utilizes large amounts of fly ash, normally a waste product, in place of large amounts of Portland cement as used in prior art cements. In addition, the present invention utilizes a foaming agent in place of conventional air entraining agents, which provides increased air content and enhanced workability and strength.

The masonry cement preferably comprises Class C fly ash, although Class F fly ash may also be used in addition to Class C fly ash as a beneficiating agent. The typical composition of Class C fly ash used in the present invention is set forth below in Table I.

TABLE I

| Component | Weight % |
|---|---|
| $SO_3$ | 0.23 to 3% |
| CaO | 3.5 to 40% |
| MgO | 2.5–25% |
| $SiO_2$ | 1–12% |
| $Al_2O_3$ | 0.5–40% |
| Available Alkalies | 0–4% |

Suitable types of portland cement for use in the masonry cement of the present invention include Type I, Type II, Type III, ground cement clinker, and ground slag.

The rate of set of the cement is controlled by the use of retarding agents such as gypsum, borax, boric acid, citric acid, and high alumina clays. Suitable high alumina clays for use in the present invention include Gibsite, clay kiln dust, raw kaolin, and meta-kaolins. Gibsite is commercially available from C.E. Minerals, Andersonville, Ga. A suitable raw kaolin is Huber 95 clay, available from Huber Corporation, Macon, Ga.

Suitable meta-kaolins are commercially available from a number of sources including Huber Corporation, Burgess Pigment Co. and Southern Clay Products. A preferred meta-kaolin is Opti White, available from Burgess Pigment Co.

Suitable air entraining agents include foaming agents and resins. Preferred foaming agents include Bio-Terge As-90 Beads, Lethanol LAL Powder, Stepanol WA-100, Lethanol LAL flakes, and Stepan ME Dry, all available from Stepan Chemical Co. Where foaming agents are used as the air entraining agents, foam stabilizers are also preferably included in the cement composition. Suitable foam stabilizers include OMB foam stabilizer, Ninol CMP, Ninol LMP, Ninol 96-SL, and Stepantex 210, all available from Stepan Chemical Co.

Preferred resins for use as an air entraining agents are Vinsol™ and Dresinate TX™, commercially available from Hercules Chemical Company.

Suitable chelating agents for inclusion in the cement composition include Versene™ and Versenex™, available from The Dow Chemical Company. We have found that the addition of a chelating agent helps to prevent efflorescence and also provides a significant increase in compressive strength.

Suitable coloring agents for use in the cement composition include natural or synthetic oxide coloring pigments. Preferred coloring agents for use are commercially available from Prince Manufacturing Company, Quincy, Ill.

It is also desirable that mortar prepared from the masonry cement composition exhibit resistance to rain penetration and other weather conditions. The masonry cement composition preferably includes the addition of one or more water repelling agents such as stearates and ethylene vinyl acetate. Suitable calcium, zinc and/or sodium stearates are commercially available from The Norac Company, Inc., Helena, Ark., under the designations Norac COAD 10 And COAD 10 Disperso. Stearates also are available from Chemical Associates, Copley Ohio.

Ethylene vinyl acetates such as Elotex EV 2000 are commercially available from National Starch and Chemical Company, Bridgewater, N.J. The effect of water penetration resistance can easily be seen by placing drops of water on hardened mortar oriented in the lateral position. Mortars treated with either or both of the above sets of chemicals "bead up" water much like the beads of water of a freshly waxed car after being in the rain. Untreated mortars allow quick penetration of water into the hardened mortar, sometimes immediately to perhaps a minute for total disappearance of visible free water. By using the above chemicals, mortar joints and wall systems can be made more weather resistant than untreated cements.

The masonry cement composition of the present invention is preferably formed by providing about 80 to 95% by weight of subbituminous fly ash. About 5 to 20% by weight of the fly ash is then separated out and combined with the retarding agent. Preferably, the retarding agent includes a blend of about citric acid, boric acid, and clay(s). About 0.1 to 5 wt% Portland cement is then added to this mixture, and the remainder of the fly ash is then combined with the mixture and blended to produce the masonry cement composition.

The air entraining agent, chelating agents, water repelling agents, and coloring agents may also be added to the separated fly ash mixture prior to combining with the remaining fly ash.

A beneficiating agent comprising class F fly ash may also be added to the cement mixture in an amount up to 20 wt%.

Mortar prepared from the masonry cement of the present invention is preferably prepared in a conventional manner using damp, loose sand mixed with water. The masonry cement of the present invention may be used to produce mortar meeting the specifications of Type N and Type S classifications.

In order that the invention may be more readily understood, reference is made to the following examples, which are intended to be illustrative of the invention, but are not intended to be limiting in scope.

Example 1

A masonry cement was produced having the following composition:

| Component | Amount (% by Weight) |
|---|---|
| GRDA Fly Ash | 89–99% |
| Portland Cement | 1–5% |
| H-95 Clay | 1–5% |
| Potassium Carbonate | 1–5% |
| Citric acid | 1–5% |
| PA dust (high alumina clay) | 0.1–8% |
| Bentonite Clay | 0.1–10% |
| Bio-Terge Foaming Agent | 0.1–4% |
| Ninol CMP Stabilizer | 0.1–4% |
| Versene ™ - Chelating agent | 0.01–2% |

Very small amounts of the components were blended with the total fly ash mass by pre-blending with larger amounts of fly ash and then blending into the total mass.

The resulting cement was formed into a mortar and tested and found to meet the requirements for ASTM C91–98. The test results are shown below.

| Time of setting, Gilmore: | |
|---|---|
| Initial set | 180 minutes |
| Final set | 240 minutes |
| Compressive Strength: | |
| 7 days | 990 psi |
| 28 days | 1540 psi |
| Air Content (%) | 18.4 |
| Water Retention (%) | 87.3 |

Example 2

A comparative study was conducted between the masonry cement composition of the present invention (MRT) (Type N) and several other commercial brands of masonry cement. The results are shown below in Table I.

TABLE I

| | MRT (present invention) | Giant | Brixment | Blue Circle | ASTM Requirement |
|---|---|---|---|---|---|
| Amt. Of H₂O | 160 ml | 246 ml | 250 ml | 247 ml | — |
| Flow | 109 | 108 | 110 | 108 | — |
| Density | 2.69 | 3.01 | 3.06 | 3.05 | — |
| Air Content | 23.9% | 16.8% | 19.8% | 16.9% | Minimum 8% |
| Compressive strength (7 days) | 1430 psi | 1265 psi | 801 psi | 1047 psi | Minimum 500 psi |

It should be noted that mortar formed from the MRT cement of the present invention unexpectedly exhibits superior compressive strength even with a high air content. It should also be noted that a significantly lower amount of water is required when forming a mortar using the MRT cement.

Example 3

A Type N Masonry Cement was produced having the following composition:

| Component | Amount (% by Weight) |
|---|---|
| GRDA Fly Ash | 80–89% |
| Portland Cement | 1–5% |
| Potassium Carbonate | 0.1–5% |
| Citric acid | 1–5% |
| Kaolin Clay | 0.1–10% |
| Bentonite Clay | 0.1–15% |
| Hercules Dresinate TX | 0.001–1% |
| Boric Acid | 0.1–4% |
| Versene - Chelating agent | 0.01–2% |
| Coloring Pigment | 0.01–10% |
| Calcium Stearate | .05–1% |
| Ethylene-Vinyl Acetate | 0.0010–1.0% |

Very small amounts of the components were blended with the total fly ash mass by pre-blending with larger amounts of fly ash and then blending into the total mass.

The resulting cement was tested and found to meet the requirements for ASTM C91. The test results are shown below.

| Time of setting, Gilmore: | |
|---|---|
| Initial set | 90 to 240 minutes |
| Final set | 120 to 360 minutes |
| Compressive Strength: | |
| 7 days | 870 psi |
| 28 days | 1330 psi |
| Air Content (%) | 20.1 |
| Water Retention (%) | 96 |
| Autoclave Expansion (%) | 0.05 |
| Minus 325 Mesh Screen | 81.6% |

Example 4

A Type S Masonry Cement was produced having the following composition:

| Component | Amount (% by Weight) |
|---|---|
| GRDA Fly Ash | 84–92% |
| Portland Cement | 1–5% |
| Potassium Carbonate | 0.1–5% |
| Citric acid | 1–5% |
| Kaolin Clay | 0.1–10% |
| Bentonite Clay | 0.1–6% |
| Hercules Dresinate TX | 0.001–1% |
| Boric Acid | 0.1–4% |
| Versene - Chelating agent | 0.01–2% |
| Coloring Pigment | 0.01–10% |
| Calcium Stearate | .05–1% |
| Ethylene-Vinyl Acetate | 0.0010–1.0% |

Very small amounts of the components were blended with the total fly ash mass by pre-blending with larger amounts of fly ash and then blending into the total mass.

The resulting cement was tested and found to meet the requirements for ASTM C91. The test results are shown below.

| Time of setting, Gilmore: | |
|---|---|
| Initial set | 90 to 200 minutes |
| Final set | 100 to 300 minutes |
| Compressive Strength: | |
| 7 days | 1430 psi |
| 28 days | 2350 psi |
| Air Content (%) | 17 |
| Water Retention (%) | 98 |

|                        |            |
|------------------------|------------|
| Autoclave Expansion (%) | −0.02 |
| Minus 325 Mesh Screen  | 82.3% |

Example 5

A Type M Masonry Cement was produced having the following composition:

| Component | Amount (% by Weight) |
|-----------|----------------------|
| GRDA Fly Ash | 86–93% |
| Portland Cement | 1–5% |
| Potassium Carbonate | 0.1–5% |
| Citric acid | 1–5% |
| Kaolin Clay | 0.1–10% |
| Bentonite Clay | 0.1–5% |
| Hercules Dresinate TX | 0.001–1% |
| Versene - Chelating agent | 0.01–2% |
| Coloring Pigment | 0.01–10% |
| Calcium Stearate | .05–1% |

Very small amounts of the components were blended with the total fly ash mass by pre-blending with larger amounts of fly ash and then blending into the total mass.

The resulting cement was tested and found to meet the requirements for ASTM C91. The test results are shown below.

| Time of setting, Gilmore: | |
|---------------------------|--|
| Initial set | 90 to 180 minutes |
| Final set | 100 to 280 minutes |
| Compressive Strength: | |
| 7 days | 2460 psi |
| 28 days | 3140 psi |
| Air Content (%) | 17 |
| Water Retention (%) | 95 |
| Autoclave Expansion (%) | −0.01 |
| Minus 325 Mesh Screen | 82.5% |

While certain representative embodiments and details have been shown for purposes of illustrating the invention, it will be apparent to those skilled in the art that various changes in the methods and apparatus disclosed herein may be made without departing from the scope of the invention, which Is defined in the appended claims.

What is claimed is:

1. A masonry cement composition comprising:
   from about 0.1 to 10% by weight Portland cement;
   from about 0.1 to 5% by weight potassium carbonate;
   from about 0.1 to 30% by weight of a retarding agent;
   from about 0.1 to 5% by weight of an air entraining agent;
   from about 0.1 to 3% by weight of a chelating agent; and
   the balance fly ash; wherein said masonry cement composition, when formed into a mortar, exhibits a compressive strength of at least 1400 psi after seven days and an air content of at least 17% by weight.

2. The masonry cement composition of claim 1 wherein said retarding agent is selected from the group consisting of gypsum, borax, boric acid, citric acid, high alumina clays, and blends thereof.

3. The masonry cement composition of claim 1 wherein said air entraining agent comprises a foaming agent.

4. The masonry cement composition of claim 3 further including from about 0.1% to about 5% by weight of a foam stabilizer.

5. The masonry cement composition of claim 1 wherein said air entraining agent comprises a resin.

6. The masonry cement composition of claim 1 further including from about 0.1 to 10% by weight of a coloring agent.

7. The masonry cement composition of claim 1 comprising from about 80 to 95% by weight fly ash.

8. A method of making a masonry cement composition comprising:
   a) providing from about 80 to 95% by weight fly ash having a lime content of at least 21% by weight;
   b) separating from about 5 to 20% by weight of said fly ash;
   c) adding to said separated fly ash a retarding agent and Portland cement to form a mixture;
   d) adding an air entraining agent to said mixture;
   e) adding a chelating agent to said mixture:
   f) blending the remaining portion of said fly ash with said mixture; wherein said masonry cement composition is further formed into a mortar; said mortar exhibiting a compressive strength of 1400 psi after seven days and an air content of at least 17% by weight.

9. The method of claim 8 wherein said retarding agent is selected from the group consisting of gypsum, borax, boric acid, citric acid, high alumina clays, and blends thereof.

10. The method of claim 8 including adding a coloring agent to said mixture.

11. The method of claim 8 including adding a water repelling agent to said mixture.

\* \* \* \* \*